US011433835B2

(12) United States Patent
Chandrasekaran

(10) Patent No.: US 11,433,835 B2
(45) Date of Patent: Sep. 6, 2022

(54) ENERGY ABSORBING MEMBER FOR A VEHICLE BUMPER ASSEMBLY

(71) Applicant: Nissan North America, Inc., Franklin, TN (US)

(72) Inventor: Aravind Chandrasekaran, Tamil Nadu (IN)

(73) Assignee: NISSAN NORTH AMERICA, INC., Franklin, TN (US)

( * ) Notice: Subject to any disclaimer, the term of this patent is extended or adjusted under 35 U.S.C. 154(b) by 26 days.

(21) Appl. No.: 17/087,348

(22) Filed: Nov. 2, 2020

(65) Prior Publication Data

US 2022/0134983 A1 May 5, 2022

(51) Int. Cl.
*B60R 19/34* (2006.01)
*B60R 19/02* (2006.01)
*B60R 19/24* (2006.01)
*B60R 19/18* (2006.01)

(52) U.S. Cl.
CPC .............. *B60R 19/34* (2013.01); *B60R 19/02* (2013.01); *B60R 19/24* (2013.01); *B60R 2019/1866* (2013.01)

(58) Field of Classification Search
CPC ......... B60R 19/02; B60R 19/03; B60R 19/04; B60R 19/12; B60R 19/18; B60R 19/23; B60R 19/24; B60R 19/26; B60R 19/30; B60R 19/34; B60R 2019/186; B60R 2019/1866; B60R 2019/1873; B60R 2019/1886; B60R 2019/262; B60R 2019/264

USPC ....... 293/102, 107, 108, 110, 132, 133, 135, 293/136
See application file for complete search history.

(56) References Cited

U.S. PATENT DOCUMENTS

| | | | | |
|---|---|---|---|---|
| 3,819,218 A | * | 6/1974 | Liu | ............... B60R 19/34 293/133 |
| 4,844,213 A | * | 7/1989 | Travis | ............... E01F 15/146 188/377 |
| 5,074,391 A | * | 12/1991 | Rosenzweig | ........... B60R 19/34 188/374 |
| 7,066,509 B2 | * | 6/2006 | Kollaritsch | ............. B60R 19/34 293/132 |
| 8,517,454 B1 | * | 8/2013 | Huber | ............... B60R 19/18 296/187.09 |

(Continued)

*Primary Examiner* — Dennis H Redder
*Assistant Examiner* — Joyce Eileen Hill
(74) *Attorney, Agent, or Firm* — Global IP Counselors, LLP

(57) ABSTRACT

A vehicle bumper assembly includes a first energy absorbing member extending in a lateral direction of a vehicle. A reinforcement member extends in the lateral direction of the vehicle and is connected to the first energy absorbing member. A second energy absorbing member is connected to the reinforcement member. The second energy absorbing member includes a first bracket member configured to be connected to a vehicle body structure of the vehicle. A retaining member extends outwardly from the first bracket member. The retaining member has a first portion having a substantially constant first height and a second portion having a second height less than the first height. At least one first compression member is movably disposed in the retaining member. The at least one first compression member is configured to move through the retaining member responsive to an impact event.

20 Claims, 5 Drawing Sheets

(56) References Cited

U.S. PATENT DOCUMENTS

| | | | |
|---|---|---|---|
| 9,725,057 B2 * | 8/2017 | Lee ........................ | B60R 19/30 |
| 2009/0134643 A1 * | 5/2009 | Alvarsson ............... | B60R 19/56 |
| | | | 293/133 |
| 2020/0101913 A1 | 4/2020 | Rangel et al. | |

* cited by examiner

ENERGY ABSORBING MEMBER FOR A VEHICLE BUMPER ASSEMBLY

BACKGROUND

Field of the Invention

The present invention generally relates to a vehicle bumper assembly having an energy absorbing member configured to absorb energy during an impact event. More specifically, the present invention relates to an energy absorbing member for a vehicle bumper assembly including at least one compression member configured to move during an impact event to absorb energy associated with the impact event.

Background Information

A vehicle bumper assembly is configured to absorb energy during an impact event.

SUMMARY

A need exists for an energy absorbing member for a vehicle bumper assembly in which at least one compression member is configured to move during an impact event to absorb energy associated with the impact event and to reduce a force transmitted to a vehicle body structure.

In view of the state of the known technology, one aspect of the present disclosure is to provide a vehicle bumper assembly for a vehicle. The vehicle bumper assembly includes a first energy absorbing member, a reinforcement member, and a second energy absorbing member. The first energy absorbing member extends in a lateral direction of a vehicle. The reinforcement member extends in the lateral direction of the vehicle and is connected to the first energy absorbing member. The second energy absorbing member is connected to the reinforcement member. The second energy absorbing member includes a first bracket member, a retaining member and at least one first compression member. The first bracket member is configured to be connected to a vehicle body structure of the vehicle. The retaining member extends outwardly from the first bracket member. The retaining member has a first portion having a substantially constant first height and a second portion having a second height less than the first height. The at least one first compression member is movably disposed in the retaining member. The at least one first compression member is configured to move through the retaining member responsive to an impact event.

Another aspect of the present invention is to provide a vehicle bumper assembly including a vehicle body structure of a vehicle and a fascia member connected to the vehicle body structure. A first energy absorbing member extends in a lateral direction of the vehicle and is connected to the fascia member. A reinforcement member extends in the lateral direction of the vehicle and is connected to the first energy absorbing member. A second energy absorbing member is connected to the reinforcement member. The second energy absorbing member includes a first bracket member connected to the vehicle body structure, and a second bracket member connected to the reinforcement member. A first retaining member extends between the first bracket member and the second bracket member. The first retaining member has a first portion having a substantially constant first height and a second portion having a second height less than the first height. The first portion being disposed forward of the second portion in a vehicle longitudinal direction. At least one first compression member is movably disposed in the first retaining member. The at least one first compression member is configured to move through the first retaining member responsive to an impact event.

Also other objects, features, aspects and advantages of the disclosed vehicle bumper assembly will become apparent to those skilled in the art from the following detailed description, which, taken in conjunction with the annexed drawings, discloses exemplary embodiments of the vehicle bumper assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
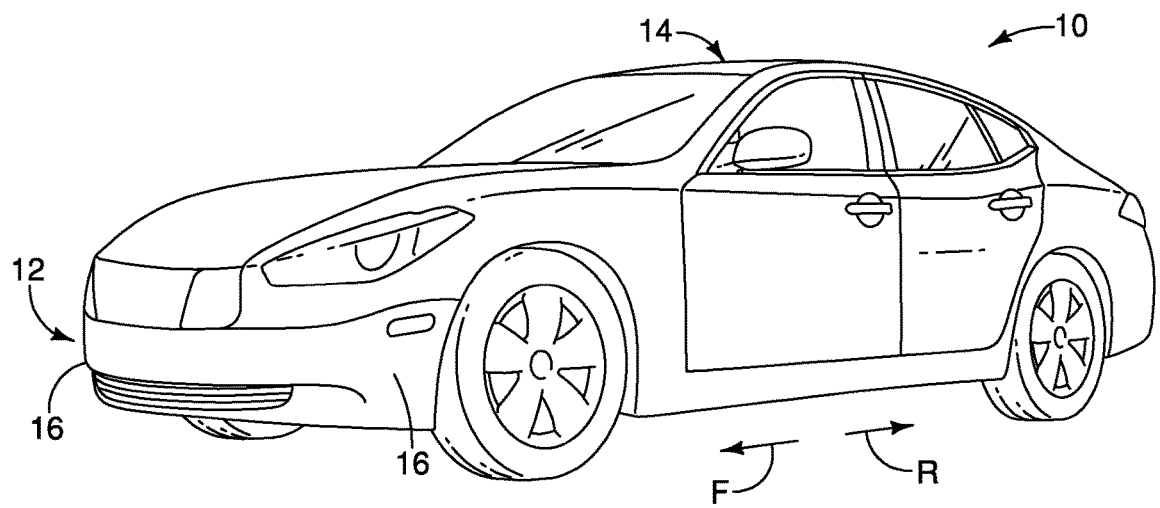
FIG. 1 is a perspective view of a vehicle including a vehicle bumper assembly in accordance with an exemplary embodiment of the present invention.
Figure 2:
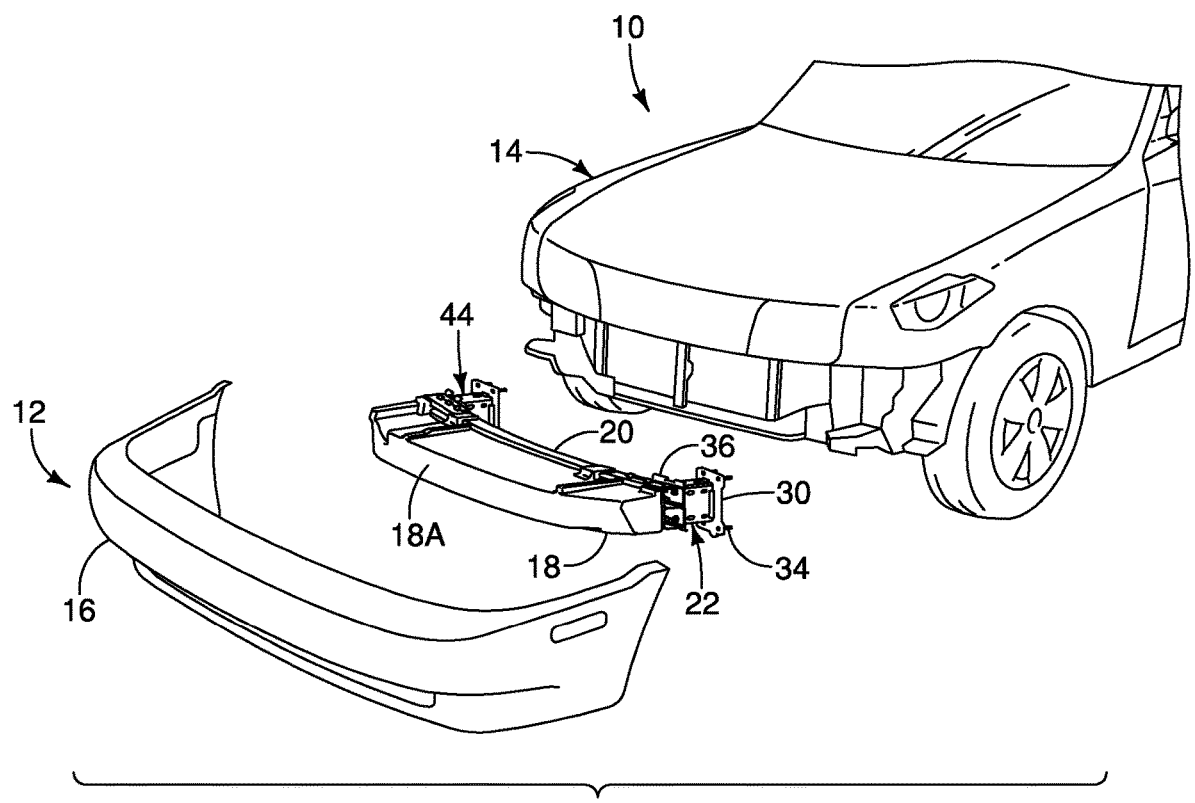
FIG. 2 is an exploded perspective view of the vehicle of FIG. 1 including the vehicle bumper assembly.

Referring initially to FIGS. 1 and 2, a vehicle 10 includes a vehicle bumper assembly 12 in accordance with an exemplary embodiment of the present invention. The vehicle 10 also includes a vehicle body structure 14 that includes many conventional structural and support elements. Vehicle body structures 14 and support elements thereof are well known, such that further description is omitted for the sake of brevity.

The vehicle body structure 14 supports the vehicle bumper assembly 12. Specifically, in the depicted embodiment, the vehicle bumper assembly 12 is attached to a front end of the vehicle body structure 14, as shown in FIGS. 1 and 2. However, it should be understood from the drawings and the description herein that the vehicle bumper assembly 12 can also be attached to a side or a rear end of the vehicle body structure 14.

As shown in FIGS. 2-10, the vehicle bumper assembly 12 includes a vehicle facia member 16, a first energy absorbing member 18, a reinforcement member 20, and a second energy absorbing member 22.

The vehicle facia member 16 is a conventional vehicle component that is configured to be attached to opposite lateral sides of the vehicle body structure 14 covering and at least partially concealing the first energy absorbing member 18, the reinforcement member 20, and the second energy absorbing member 22, as shown in FIGS. 1 and 2. The vehicle facia member 16 is shaped and contoured to provide the vehicle 10 with a predetermined appearance and style. However, it should be understood from the drawings and the description herein that the vehicle facia member 16 is not limited to the appearance and shapes depicted herein, and can be provided with alternative shapes and contours depending upon the overall design of the vehicle 10.

The first energy absorbing member 18 extends in a lateral direction of the vehicle, as shown in FIG. 2. The first energy absorbing member 18 is preferably a molded structure that is unitarily formed as a one-piece member. The first energy absorbing member 18 is preferably made of a polypropylene, such as expanded polypropylene. The first energy absorbing member 18 is configured to be directly attached to the reinforcement member 20.

Figure 3:
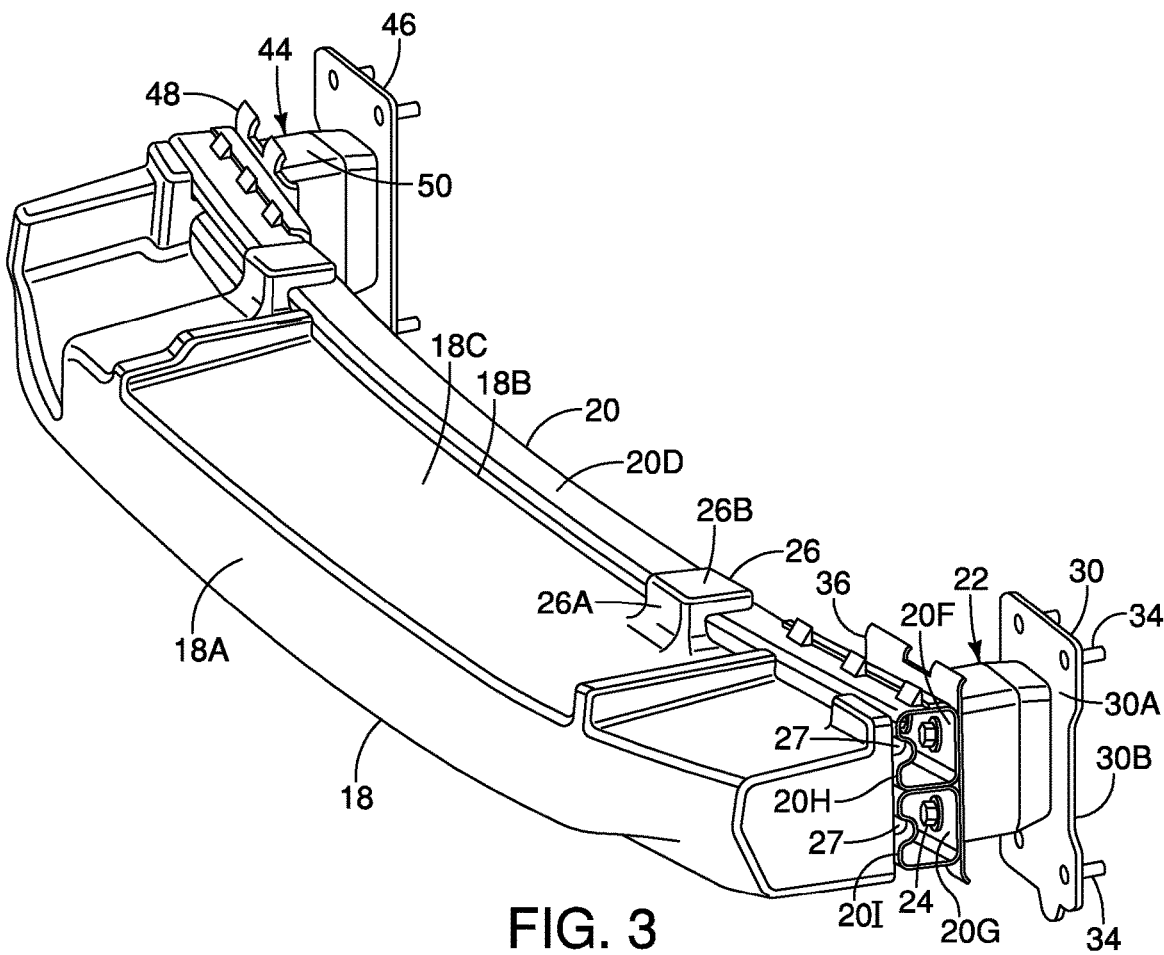
FIG. 3 is a perspective view of the vehicle bumper assembly of FIG. 2.
Figure 5:
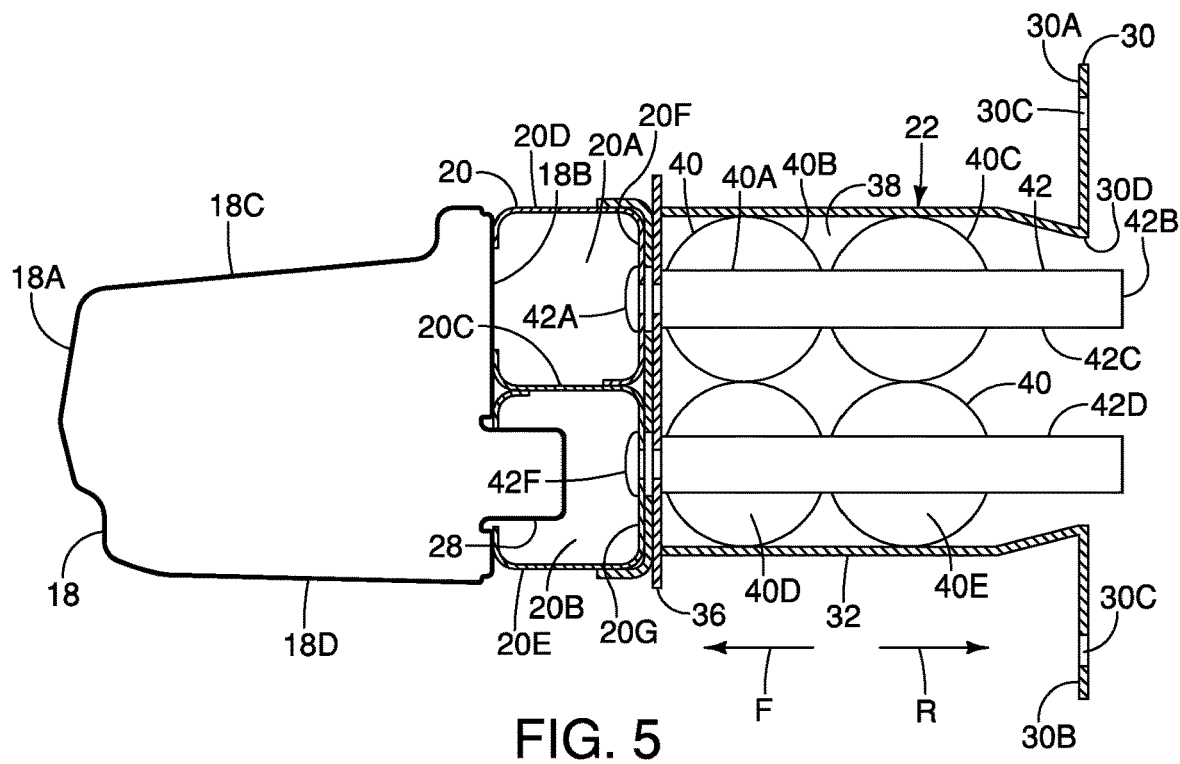
FIG. 5 is an elevational view in cross section of the vehicle bumper assembly of FIG. 3.

The first energy absorbing member 18 includes a forward facing surface 18A, a rearward facing surface 18B, an upward facing surface 18C extending between the forward and rearward facing surfaces 18A and 18B, and a downward facing surface 18D extending between the forward and rearward facing surfaces 18A and 18B, as shown in FIGS. 3 and 5. The forward facing surface 18A faces the vehicle facia member 16, as shown in FIG. 2. The rearward facing surface 18B is attached to the reinforcement member 20 in any suitable manner, such as with mechanical fasteners (not shown) and/or an adhesive material. The rearward facing surface 18B faces in a rearward direction R relative to the vehicle 10. The forward facing surface 18A is opposite the rearward facing surface 18B and faces in a forward direction F relative to the vehicle 10.

The reinforcement member 20 extends in the lateral direction of the vehicle 10 and is connected to the first energy absorbing member 18, as shown in FIG. 2. The reinforcement member 20 can be made of steel, metal alloys, composite materials, or any other rigid materials that can be formed or shaped into a beam, such as the depicted shape of the rigid support member 20, as shown in FIGS. 2-7. The reinforcement member 20 is fixedly attached to the second energy absorbing member 22 in any suitable manner, such as by welding techniques and/or mechanical fasteners 24.

The reinforcement member 20 includes a first cavity 20A and a second cavity 20B separated by a dividing wall 20C, as shown in FIGS. 3 and 5. The first and second cavities extend in a lateral direction of the vehicle 10. The first cavity 20A has an upper wall 20D and the second cavity 20B has a lower wall 20E. The first and second cavities 20A and 20B have first and second rear walls 20F and 20G, respectively, that are connected to the second energy absorbing member 22. The first and second cavities 20A and 20B have first and second forward walls 20H and 20I, respectively, that are connected to the first energy absorbing member 18. First and second laterally extending recesses 20J and 20K are disposed in the first and second forward walls 20H and 20I, respectively. Although shown with first and second cavities 20A and 20B, the reinforcement member 20 can be formed with any suitable number of cavities, such as one, two, or more.

Figure 4:
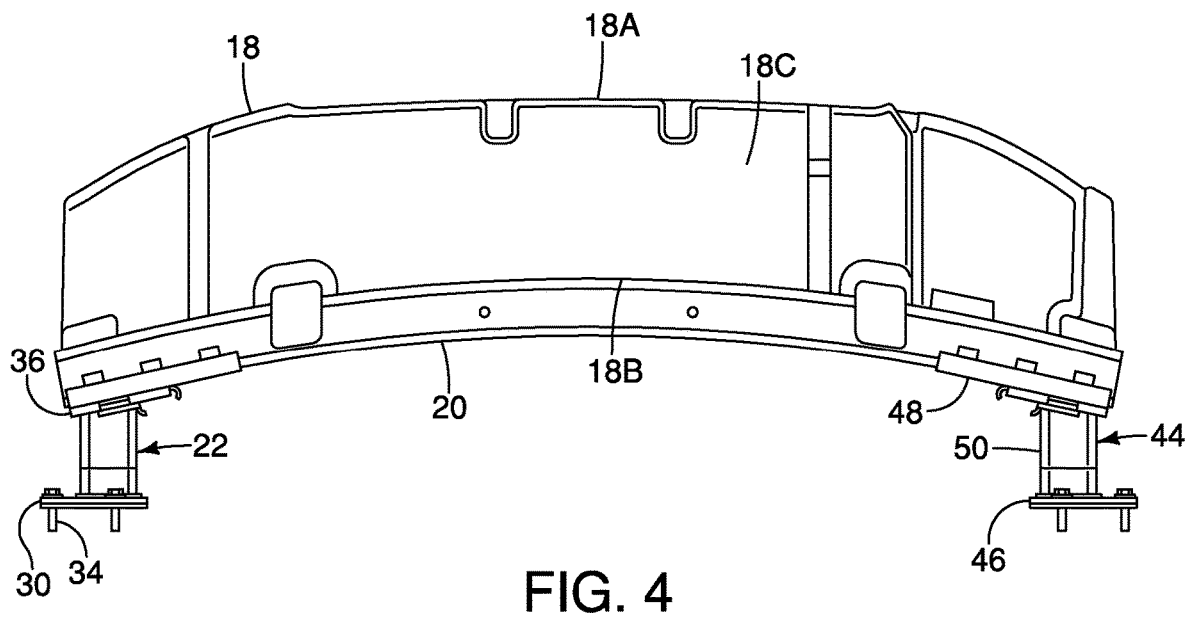
FIG. 4 is a top plan view of the vehicle bumper assembly of FIG. 3.
Figure 6:
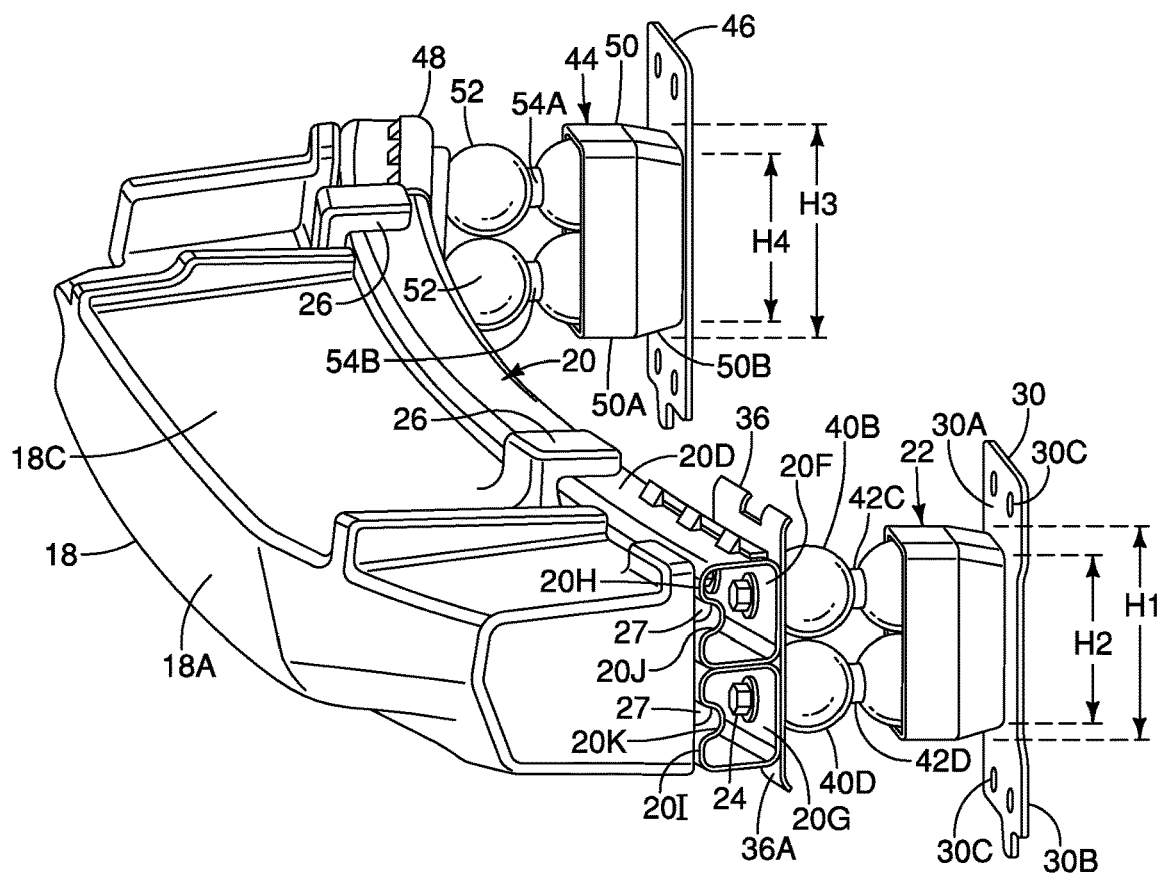
FIG. 6 is an exploded perspective view of the vehicle bumper assembly of FIG. 3.

The first energy absorbing member 18 includes at least one positioning member 26, as shown in FIGS. 3, 4 and 6. The at least one positioning member 26 extends from the upward facing surface 18C of the first energy absorbing member and contacts the upper wall 20D of the reinforcement member 20. The positioning member 26 has a first leg 26A extending from the upward facing surface 18C of the first energy absorbing member, and a second let 26B extending from the first leg 26A. The second leg 26B extends in the rearward vehicle direction R (FIG. 1). A lower surface of the second leg 26B contacts the upper wall 26D of the reinforcement member 20. Although the first energy absorbing member 18 is shown with two positioning members 26, any suitable number can be used.

The first energy absorbing member 18 can include at least one first projection 27 extending in a vehicle rearward direction R (FIG. 1) from a rearward facing surface 18B, as shown in FIGS. 3 and 6. As shown in FIGS. 3 and 6, the first energy absorbing member 18 has at least two first projections 27. The first projections 27 are received by the first and second laterally extending recesses 20J and 20K of the reinforcement member 20. The first energy absorbing member 18 can have any suitable number of first projections 27.

The first energy absorbing member 18 can include at least one second projection 28 extending in a vehicle rearward direction R (FIG. 1) from the rearward facing surface 18B, as shown in FIG. 5. The second projection 28 is received by an opening in the second forward wall 20I of the reinforcement member 20. The second projection 28 extends through the opening in the second forward wall 20I and into the second cavity 20B.

The second energy absorbing member 22 is connected to the reinforcement member 20, as shown in FIGS. 2-7. The second energy absorbing member 22 includes a first bracket member 30, a retaining member 32 and at least one first compression member 40. The second energy absorbing member 22 is disposed on an opposite side of the reinforcement member 20 than the first energy absorbing member 18 in a longitudinal direction of the vehicle 10. In other words, the first energy absorbing member 18 is disposed forward of the reinforcement member 20, and the second energy absorbing member 22 is disposed rearward of the reinforcement member 20.

Figure 7:
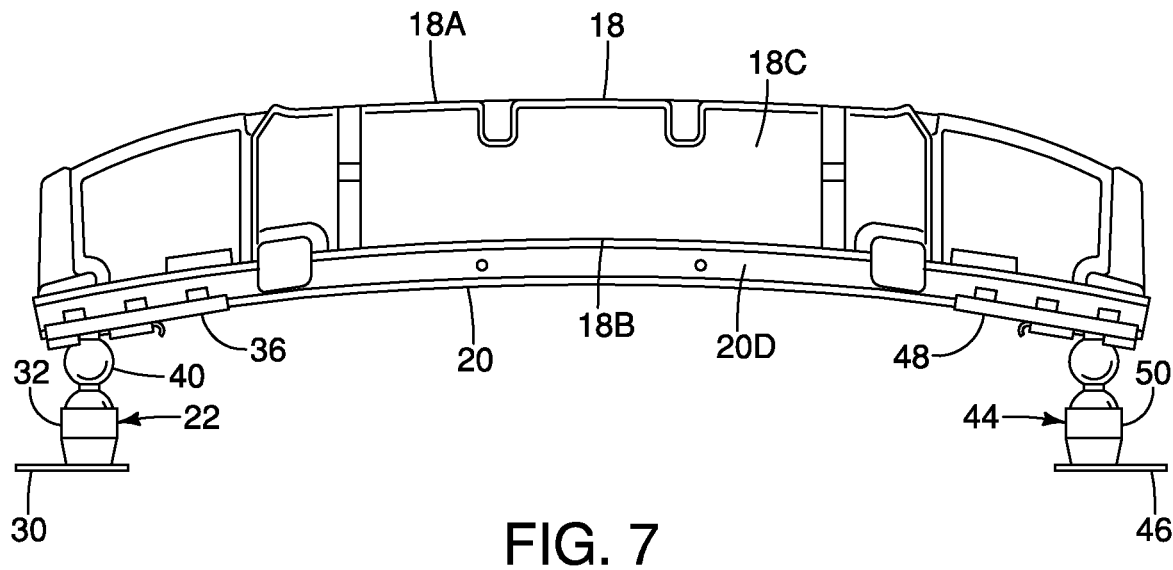
FIG. 7 is an exploded top plan view of the vehicle bumper assembly of FIG. 6.

The first bracket member 30 is configured to be connected to the vehicle body structure 14 of the vehicle 10, as shown in FIG. 2. The first bracket member 30 has a forward facing surface 30A and a rearward facing surface 30B, as shown in FIGS. 3, 6 and 7. A plurality of fastener openings 30C extend through the first bracket member 30 from the forward facing surface 30A to the rearward facing surface 30B. The plurality of fastener openings 30C are configured to receive fasteners 34, as shown in FIGS. 2-4, to fixedly attach the first bracket member 30 to the vehicle structure 14. An opening 30D is disposed in the first bracket member 30 and extends from the forward facing surface 30A to the rearward facing surface 30B, as shown in FIGS. 5 and 8-10.

The retaining member 32 extends outwardly from the first bracket member 30, as shown in FIGS. 3-5 and 8. The retaining member 32 has a first portion 32A having a substantially constant first height H1 and a second portion having a second height H2. The second height H2 is less than the first height H1. In other words, the second portion 32B has a reduced cross-sectional area relative to the cross-sectional area of the first portion 32A. The second portion 32B is connected to and extends from the forward facing surface 30A of the first bracket member 30 in a vehicle forward direction F. The rearward end of the second portion 32B defines the opening 30D in the first bracket 30. The second portion 32B is connected to the forward facing surface 30A of the first bracket member 30 in any suitable manner, such as by welding. The first portion 32A of the retaining member 32 extends from the second portion 32B in a vehicle forward direction F. The first portion 32A is connected to a second bracket member 36. The first portion 32A extends between the second bracket member 36 and the second portion 32B. The first portion 32A of the retaining member 32 is disposed forward of the second portion 32B in the vehicle longitudinal direction. The retaining member 32 extends between the first bracket member 30 and the second bracket member 36.

The first and second portions 32A and 32B of the retaining member 32 define a cavity 38 of the retaining member 32. The first and second portions 32A and 32B of the retaining member can have any suitable cross-sectional shape when viewed in a vehicle forward direction F, such as being substantially square, substantially rectangular or substantially circular.

The second bracket member 36 is connected to the reinforcement member 20, as shown in FIGS. 2-7. The second bracket member 36 has a forward facing surface 36A and a rearward facing surface 36B. The forward facing surface 36A is connected to the reinforcement member 20. A plurality of openings is disposed in the second bracket member 36 to receive the plurality of fasteners 24 to secure the second energy absorbing member 22 to the reinforcement member 20. The plurality of openings extend from the forward facing surface 36A to the rearward facing surface 36B. The retaining member 32 extends rearwardly from the rearward facing surface 36B. The first portion 32A is connected to the second bracket member 36 in any suitable manner, such as by welding. Alternatively, the first bracket member 30, the retaining member 32 and the second bracket member 36 are integrally formed as a one-piece member.

Figure 8:
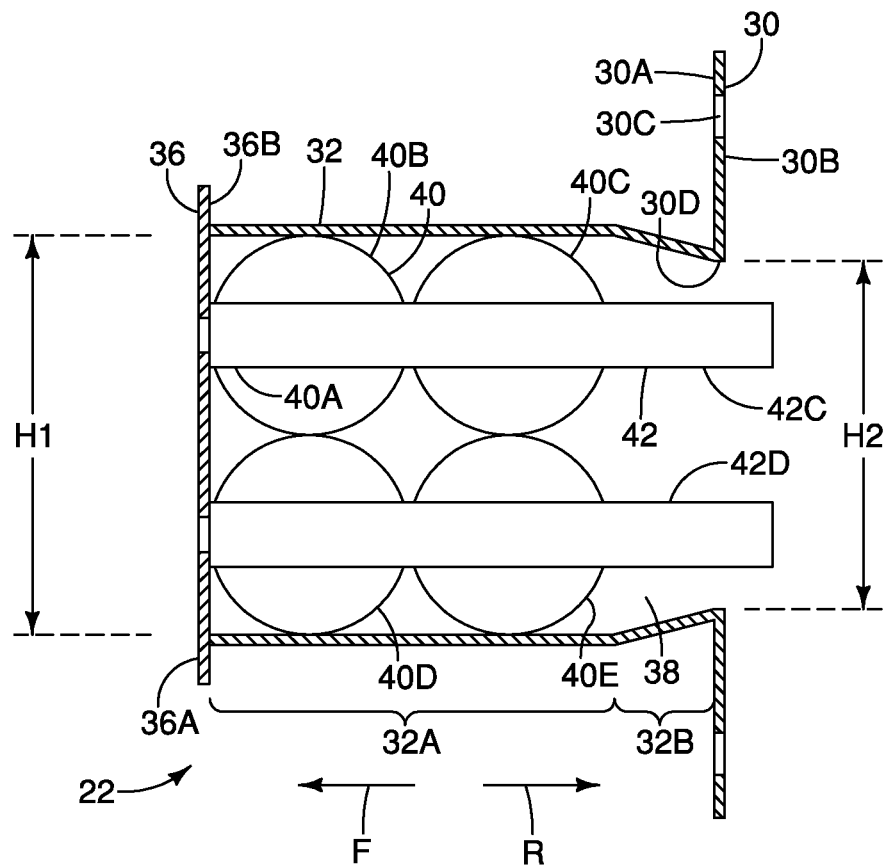
FIG. 8 is a side elevational view in cross section of an energy absorbing member of the vehicle bumper assembly of FIG. 5 in a first position prior to an impact event.

As shown in FIG. 8, the first portion 32A of the retaining member 32 has a first height H1. The second portion 32B of the retaining member 32 has a second height H2. The second height H2 is less than the first height H1. The second height H2 of the second portion 32B of the retaining member 32 substantially continuously decreases between the first portion 32A of the retaining member and the first bracket member 30. In other words, the second height H2 of the second portion 32B is largest at the most forward end of the second portion 32B at the connection with the first portion 32A and smallest at the most rearward end of the second portion 32B at the connection to the first bracket 30. The second height H2 of the second portion 32B of the retaining member 32 substantially continuously decreases in the vehicle rearward direction R.

Figure 9:
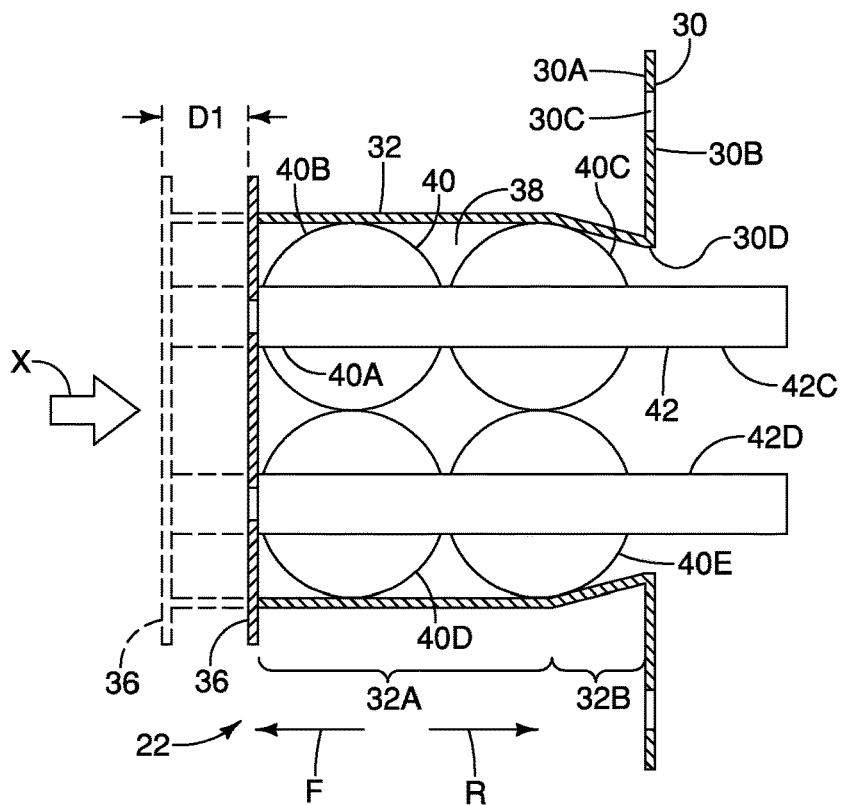
FIG. 9 is a side elevational view in cross section of the energy absorbing member of the vehicle bumper assembly of FIG. 8 in a second position responsive to the impact event.
Figure 10:
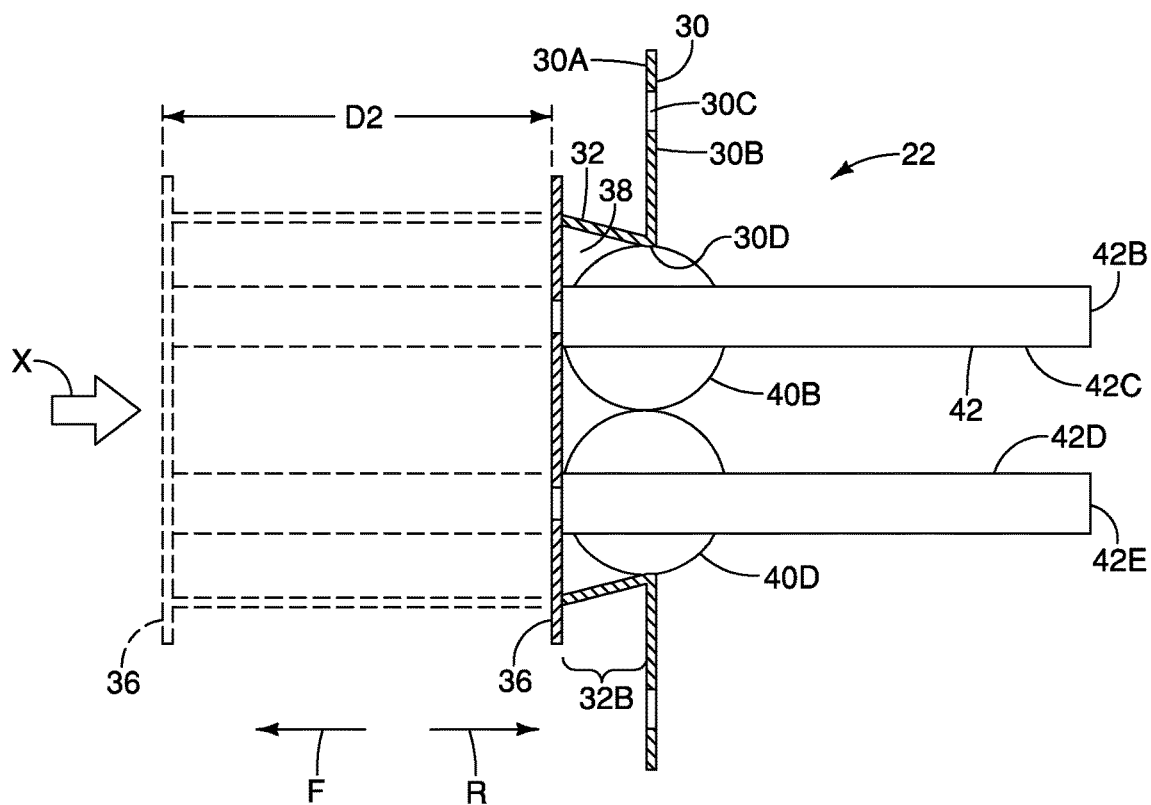
FIG. 10 is a side elevational view in cross section of the energy absorbing member of the vehicle bumper assembly of FIG. 9 in a third position responsive to the impact event.

At least one compression member 40 is movably disposed in the retaining member 32, as shown in FIGS. 5-10. The at least one compression member 40 is disposed in the cavity 38 of the retaining member 32 and is configured to move through the retaining member 32 responsive to an impact event, as shown in FIGS. 8-10. The at least one compression member 40 is made of any suitable compressible material. Preferably, the at least one compression member 40 is made of the same material as the first energy absorbing member 18. In other words, the at least one compression member 40 preferably made of a polypropylene, such as expanded polypropylene. The at least one compression member 40 can have any suitable shape, such as being substantially circular, substantially elliptical, or substantially cylindrical.

A guide member 42 extends through the cavity 40 of the retaining member 32, as shown in FIGS. 5 and 8-10. The guide member 42 extends through the first and second portions 32A and 32B of the retaining member 32. A first end 42A of the guide member 42 is connected to the reinforcement member 20 and to the second bracket member 36 of the retaining member 32. The first end 42A is disposed on a forward side of openings in the rear wall 20F and the second bracket member 36. The first end 42A of the guide member 42 is larger than the openings in the rear wall 20F and the second bracket member 36 to prevent the guide member 42 from passing through the openings in the rear wall 20F and the second bracket member 36 in the rearward direction R. The first end 42A can be a fastener extending through the reinforcement member 20 and the second bracket 36 to threadedly engage a body of the guide member 42. A second end 42B of the guide member 42 is free. The second end 42B is preferably disposed rearwardly of the first bracket member 30, such that the second end passes through the opening 30D in the retaining member 32. Alternatively, the second end 42B can be disposed forward of the first bracket member 30.

A bore 40A extends completely through the compression member 40 and receives the guide member 42, as shown in FIGS. 5 and 8-10. The compression member 40 is movably disposed on the guide member 42. As shown in FIGS. 5-10, two first compression members 40B and 40C are disposed on the guide member 42. The first compression member 40B is disposed forward of the second compression member 40C. As shown in FIGS. 5 and 8, the first and second compression members 40B and 40C are disposed in the first portion 32A of the retaining member 32 prior to an impact event such that the first and second compression members 40B and 40C are substantially not disposed in the second portion 32B of the retaining member 32 prior to an impact event. The first and second compression members 40B and 40C are substantially identical. Although two compression members 40B and 40C are illustrated disposed on the guide member 42, any suitable number of compression members 40 can be disposed on the guide member 42.

As shown in FIGS. 5, 6 and 8-10, two guide members 42 are disposed in the retaining member 32 of the second energy absorbing member 22. The first guide member 42C is disposed above the second guide member 42D, although the first and second guide members 42C and 42D can have any suitable orientation. The second guide member 42D preferably extends substantially parallel to the first guide member 42C. The second guide member 42D is preferably configured substantially similarly to the first guide member 42C. The second guide member 42D extends through the first and second portions 32A and 32B of the retaining member 32. The first end 42A of the first guide member 42C is disposed in the first cavity 20A of the reinforcement member 20. The first end 42F of the second guide member 42D is disposed in the second cavity 20B of the reinforcement member 20. The second ends 42B and 42E of the first and second guide members 42C and 42D, respectively, are disposed rearwardly of the first bracket member 30, such that each of the second ends 42B and 42E passes through the opening 30D in the retaining member 32, as shown in FIGS. 8-10.

At least one compression member 40 is movably disposed on the second guide member 42D. Third and fourth compression members 40D and 40E are movably disposed on the second guide member 42D, as shown in FIGS. 5, 6 and 8-10. The third and fourth compression members 40D and 40E are configured substantially similarly as the first and second compression members 40B and 40C. Preferably, an equivalent number of compression members are disposed on the first and second guide members 42C and 42D. As shown in FIGS. 5 and 8, the compression members disposed on the second guide member 42D are not disposed in the second portion 32B of the retaining member 32 prior to an impact event.

As shown in FIGS. 2-4, 6 and 7, a second energy absorbing member 22 is disposed proximal a first lateral end of the reinforcement member 20. A third energy absorbing member 44 is disposed proximal a second and opposite lateral end of the reinforcement member 20. The third energy absorbing member 44 is connected to the reinforcement member 20 in a substantially similar manner as the second energy absorbing member 22. The third energy absorbing member 44 is configured substantially similarly as the second energy absorbing member 22.

The third energy absorbing member 44 includes a third bracket member 46, a fourth bracket member 48, a second retaining member 50, and at least one second compression member 52, as shown in FIGS. 2-4, 6 and 7.

The third bracket member 46 is connected to the vehicle body structure 14 similarly as the first bracket member 30. The third bracket member 46 is configured substantially similarly as the first bracket member 30.

The fourth bracket member 48 is connected to the reinforcement member 20 similarly as the second bracket member 36. The fourth bracket member 48 is configured substantially similarly as the second bracket member 36.

The second retaining member 50 extends between the third bracket member 46 and the fourth bracket member 48. The second retaining member 50 is configured substantially similarly as the retaining member 32. A third portion 50A of the second retaining member 50 has a substantially constant third height H3, as shown in FIG. 6. A fourth portion of the second retaining member 50 has a fourth portion 50B having a fourth height H4. The fourth height H4 is less than the third height H3. In other words, the fourth portion 50B has a reduced cross-sectional area relative to the cross-sectional area of the third portion 50A. The fourth height H4 of the fourth portion 50B decreases substantially continuously between the third portion 50A of the second retaining member 50 and the third bracket member 46. The third and fourth heights H3 and H4 are configured substantially similarly as the first and second heights H1 and H2. The third portion 50A is disposed forward of the fourth portion 50B in the vehicle longitudinal direction. The third and fourth portions 50A and 50B of the second retaining member 50 are configured substantially similarly as the first and second portions 32A and 32B of the retaining member 32.

The at least one second compression member 52 is movably disposed in the second retaining member 50, as shown in FIG. 6. The at least one second compression member 52 is configured to move through the second retaining member 50 responsive to an impact event. The at least one second compression member 52 is configured substantially similarly as the at least one compression member 40.

Third and fourth guide members 54A and 54B extend through third and fourth portions 50A and 50B of the second retaining member 50, as shown in FIG. 6. The second compression members 52 are movably disposed on the third and fourth guide members 54A and 54B. The third and fourth guide members 54A and 54B are configured substantially similarly as the first and second guide members 42C and 42D.

Movement of the second energy absorbing member 22 during an impact event is illustrated in FIGS. 8-11. Although not illustrated, movement of the third energy absorbing member 44 during an impact event is substantially similar to movement of the second energy absorbing member 22.

The second energy absorbing member 22 is shown in a first position prior to an impact event in FIG. 8. The first and second compression members 40B and 40C are disposed in the first portion 32A of the retaining member 32. The second energy absorbing member 22 is shown in second and third positions responsive to the impact even in FIGS. 9 and 10.

During an impact event, a force is received by the vehicle bumper assembly 12 (FIGS. 1 and 2), as shown in FIG. 9. The force is transmitted through the fascia member 16, the first energy absorbing member 18 and the reinforcement member 20, such that a force X is imparted to the second energy absorbing member 22. The first energy absorbing member 18 and the reinforcement member 20 absorb energy of the impact event, such that the force X transmitted to the second energy absorbing member 22 is less than the force of the impact event.

The force X received by the second energy absorbing member 22 causes compression of the retaining member 32. The second bracket member 36 moves in the vehicle rearward direction R by a distance D1 (measured from the initial position of the second bracket member 36 shown in dashed lines). The compression of the retaining member 32 shortens the length of the first portion 32A of the retaining member, thereby moving the second compression member 40C on the first guide member 42C into the second portion 32B of the retaining member 32. The second compression member 40C is configured to be compressed upon moving into the second portion 32B of the retaining member 32 responsive to the impact event. The fourth compression member 40E is similarly moved on the second guide member 42D into the second portion 32B of the retaining member 32. The fourth compression member 40E is configured to be compressed upon moving into the second portion 32B of the retaining member 32 responsive to the impact event. The reduced height (or the reduced cross-sectional area) of the second portion 32B of the retaining member 32 compresses the second and fourth compression members 40C and 40E. The compression of the second and fourth compression members 40C and 40E absorbs energy of the impact event, thereby reducing energy of the impact event transmitted to the vehicle body structure 14. The compression of the second and fourth compression members 40C and 40E absorbs energy in all three directions (i.e., the x, y and z axes).

As the force X associated with the impact event continues to be transmitted to the second energy absorbing member 22, the compression members 40 continue to absorb energy. The second bracket member 36 continues to move in the vehicle rearward direction R by a distance D2 (measured from the initial position of the second bracket member 36 shown in dashed lines) to a third position, as shown in FIG. 10. The further compression of the retaining member 32 further shortens the length of the first portion 32A of the retaining member, thereby moving the first compression member 40B on the first guide member 42C into the second portion 32B of the retaining member 32. The first compression member 40B is configured to be compressed upon moving into the second portion 32B of the retaining member 32 responsive to the impact event. The third compression member 40D is similarly moved on the second guide member 42D into the second portion 32B of the retaining member 32. The third compression member 40D is configured to be compressed upon moving into the second portion 32B of the retaining member 32 responsive to the impact event. The second and fourth compression members 40C and 40E (FIG. 9) have moved on the first and second guide members 42C and 42D, respectively, through the second portion 32B of the retaining member 32 and off the respective guide members 42C and 42D. The second and fourth compression members 40C and 40E can be compressed to such a degree that the second and fourth compression members disengage the respective guide members 42C and 42D upon passing through the opening 30D in the first bracket 30. Alternatively, the second and fourth compression members 40C and 40E can pass over respective ends 42C and 42D of the first and second guide members 42C and 42D upon passing through the opening 30D in the first bracket 30. The reduced height (or the reduced cross-sectional area) of the second portion 32B of the retaining member 32 compresses the first and third compression members 40B and 40D. The compression of the first and third compression members 40B and 40D absorbs energy in all three directions (i.e., the x, y and z axes).

The continued compression of the second and fourth compression members 40C and 40E and the compression of the first and third energy members 40B and 40D continuously absorbs energy of the impact event, thereby reducing energy of the impact event transmitted to the vehicle body structure 14. The energy absorption by the second energy absorbing member 22 stops when movement of the third bracket member 36 stops. In other words, the energy absorption by the second energy absorbing member 22 stops when the force X is no longer being transmitted to the second energy absorbing member 22. The first and third compression members 40B and 40D can be in a position as shown in FIG. 10, or can have been compressed and fallen off the first and second guide members 42C and 42D after being pushed out the opening 30D in the retaining member 32.

The vehicle bumper assembly 12 in accordance with exemplary embodiments of the present invention reduces rebound energy and maximizes energy absorption. Energy of the impact event transmitted to the second energy absorbing member 22 is transmitted to the at least one compression member 40. As shown in FIG. 9, the second compression member 40C moves into the second portion 32B of the retaining member 32, thereby absorbing the transmitted energy. As shown in FIG. 10, the first compression member 40B moves into the second portion 32B of the retaining member 32, thereby continuing to absorb the transmitted energy. The vehicle bumper assembly 12 improves energy absorption associated with an impact force imparted during an impact event. By absorbing more energy over a period of time, less of the impact force is transmitted to the vehicle body structure 14. Movably disposing the at least one compression member 40 in the retaining member 32 of the second energy absorbing member 22 increases the amount of time that the second energy absorbing member absorbs energy of the impact event.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the hood release lever cover assembly. Accordingly, these terms, as utilized to describe the present invention should be interpreted relative to a vehicle equipped with the hood release lever cover assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle bumper assembly comprising:
    a first energy absorbing member extending in a lateral direction of a vehicle;
    a reinforcement member extending in the lateral direction of the vehicle and connected to the first energy absorbing member; and
    a second energy absorbing member connected to the reinforcement member, the second energy absorbing member including
        a first bracket member configured to be connected to a vehicle body structure of the vehicle;
        a retaining member extending outwardly from the first bracket member, the retaining member having a first portion having a substantially constant first height and a second portion having a second height less than the first height;
        at least one first compression member movably disposed in the retaining member, the at least one first compression member being configured to move through the retaining member responsive to an impact event; and
        a first guide member extending through the first and second portions of the retaining member, the at least one first compression member being movably disposed on the first guide member.

2. The vehicle bumper assembly according to claim 1, wherein
    the second energy absorbing member is disposed on an opposite side of the reinforcement member than the first energy absorbing member in a longitudinal direction of the vehicle.

3. The vehicle bumper assembly according to claim 1, wherein
the second portion of the retaining member is connected to the first bracket member.

4. The vehicle bumper assembly according to claim 3, wherein
the second height of the second portion of the retaining member substantially continuously decreases between the first portion of the retaining member and the first bracket member.

5. The vehicle bumper assembly according to claim 1, wherein
the at least one first compression member is not disposed in the second portion of the retaining member prior to the impact event.

6. The vehicle bumper assembly according to claim 5, wherein
the at least one first compression member is configured to be compressed upon moving into the second portion of the retaining member responsive to the impact event.

7. The vehicle bumper assembly according to claim 1, wherein
a second bracket member is connected between the first portion of the retaining member and the reinforcement member.

8. The vehicle bumper assembly according to claim 7, wherein
a first end of the first guide member is connected to the reinforcement member and to the second bracket member, and a second end of the first guide member is free.

9. The vehicle bumper assembly according to claim 1, wherein
the first bracket member has an opening therein through which the at least one first compression member is configured to move responsive to the impact event.

10. The vehicle bumper assembly according to claim 1, wherein
a second guide member extends through the first and second portions of the retaining member, and
at least one second compression member is movably disposed on the second guide member.

11. The vehicle bumper assembly according to claim 10, wherein
the second guide member extends substantially parallel to the first guide member.

12. The vehicle bumper assembly according to claim 11, wherein
the second guide member is disposed below the first guide member.

13. The vehicle bumper assembly according to claim 10, wherein
the at least one second compression member is not disposed in the second portion of the retaining member prior to the impact event.

14. The vehicle bumper assembly according to claim 13, wherein
the at least one second compression member is configured to be compressed upon moving into the second portion of the retaining member responsive to the impact event.

15. A vehicle bumper assembly comprising:
a vehicle body structure of a vehicle;
a fascia member connected to the vehicle body structure;
a first energy absorbing member extending in a lateral direction of the vehicle and connected to the fascia member;
a reinforcement member extending in the lateral direction of the vehicle and connected to the first energy absorbing member; and
a second energy absorbing member connected to the reinforcement member, the second energy absorbing member including
a first bracket member connected to the vehicle body structure;
a second bracket member connected to the reinforcement member;
a first retaining member extending between the first bracket member and the second bracket member, the first retaining member having a first portion having a substantially constant first height and a second portion having a second height less than the first height, the first portion being disposed forward of the second portion in a vehicle longitudinal direction;
at least one first compression member movably disposed in the first retaining member, the at least one first compression member being configured to move through the first retaining member responsive to an impact event; and
a first guide member extending through the first and second portions of the first retaining member, the at least one first compression member being movably disposed on the first guide member.

16. The vehicle bumper assembly according to claim 15, wherein
a third energy absorbing member connected to the reinforcement member, the third energy absorbing member including
a third bracket member connected to the vehicle body structure;
a fourth bracket member connected to the reinforcement member;
a second retaining member extending between the third bracket member and the fourth bracket member, the second retaining member having a third portion having a substantially constant third height and a fourth portion having a fourth height less than the third height, the third portion being disposed forward of the fourth portion in a vehicle longitudinal direction; and
at least one second compression member movably disposed in the second retaining member, the at least one second compression member being configured to move through the second retaining member responsive to the impact event.

17. The vehicle bumper assembly according to claim 16, wherein
the second energy absorbing member is disposed proximal a first end of the reinforcement member and the third energy absorbing member is disposed proximal a second end of the reinforcement member.

18. The vehicle bumper assembly according to claim 17, wherein
a second guide member extends through the third and fourth portions of the second retaining member, the at least one second compression member being movably disposed on the second guide member.

19. The vehicle bumper assembly according to claim 17, wherein
the second height of the second portion of the first retaining member continuously decreases between the first portion of the first retaining member and the first bracket member, and the fourth height of the fourth portion of the second retaining member continuously decreases between the third portion of the second retaining member and the third bracket member.

20. A vehicle bumper assembly comprising:
a first energy absorbing member extending in a lateral direction of a vehicle;
a reinforcement member extending in the lateral direction of the vehicle and connected to the first energy absorbing member; and
a second energy absorbing member connected to the reinforcement member, the second energy absorbing member including
  a first bracket member configured to be connected to a vehicle body structure of the vehicle;
  a retaining member extending outwardly from the first bracket member, the retaining member having a first portion having a substantially constant first height and a second portion having a second height less than the first height; and
  at least one first compression member movably disposed in the retaining member, the at least one first compression member being configured to move through the retaining member responsive to an impact event,
  the first bracket member having an opening therein through which the at least one first compression member is configured to move responsive to the impact event.

\* \* \* \* \*